US012623413B2

(12) United States Patent
Saito et al.

(10) Patent No.: US 12,623,413 B2
(45) Date of Patent: May 12, 2026

(54) REINFORCING MEMBER, STRUCTURAL MEMBER, AND METHOD OF MANUFACTURING THE SAME

(71) Applicant: NIKKISO CO., LTD., Tokyo (JP)

(72) Inventors: Koichiro Saito, Tokyo (JP); Yuki Hirata, Tokyo (JP); Ryozo Oiwa, Tokyo (JP); Keiju Oguri, Tokyo (JP)

(73) Assignee: NIKKISO CO., LTD., Tokyo (JP)

( * ) Notice: Subject to any disclaimer, the term of this patent is extended or adjusted under 35 U.S.C. 154(b) by 115 days.

(21) Appl. No.: 18/541,953

(22) Filed: Dec. 15, 2023

(65) Prior Publication Data

US 2024/0198608 A1     Jun. 20, 2024

(30) Foreign Application Priority Data

Dec. 15, 2022     (JP) ................................. 2022-200051

(51) Int. Cl.
| | |
|---|---|
| *B29C 70/46* | (2006.01) |
| *B29C 70/22* | (2006.01) |
| *B29D 99/00* | (2010.01) |
| *B29K 105/08* | (2006.01) |

(52) U.S. Cl.
CPC ............ *B29C 70/46* (2013.01); *B29C 70/222* (2013.01); *B29D 99/0014* (2013.01); *B29K 2105/0872* (2013.01); *Y10T 428/24* (2015.01); *Y10T 428/24628* (2015.01); *Y10T 428/24636* (2015.01); *Y10T 428/24669* (2015.01); *Y10T 428/24678* (2015.01); *Y10T 428/24702* (2015.01)

(58) Field of Classification Search
CPC .......... B29C 70/222; B29K 2105/0872; Y10T 428/24; Y10T 428/24628; Y10T 428/24636; Y10T 428/24669; Y10T 428/24678; Y10T 428/24702
See application file for complete search history.

(56) References Cited

U.S. PATENT DOCUMENTS

| | | | |
|---|---|---|---|
| 2019/0077093 A1* | 3/2019 | Tsotsis | .................... B29C 70/24 |
| 2022/0297396 A1* | 9/2022 | Rogers | ................. B29C 70/345 |

FOREIGN PATENT DOCUMENTS

| | | | | |
|---|---|---|---|---|
| JP | WO2014106924 A1 * | 1/2017 | ............. | B60R 19/18 |
| JP | 2019051702 A | 4/2019 | | |
| JP | 2020055447 A | 4/2020 | | |

OTHER PUBLICATIONS

"Complete Textile Glossary", Celanese® Acetate, LLC. 2001; pp. 1-2, 88-89, 116, 136, 167, 174, 179, 209-210. (Year: 2001).*

(Continued)

*Primary Examiner* — Donald M Flores, Jr.

(74) *Attorney, Agent, or Firm* — MUNCY, GEISSLER, OLDS & LOWE, P.C.

(57) ABSTRACT

A reinforcing member includes a plate-shaped member that is made of a fiber-reinforced resin in which a continuous fiber is used as a reinforcement fiber and that has a first surface and a second surface. The plate-shaped member includes an outer circumferential portion that defines an outer edge of the plate-shaped member, a convex portion that is convex on a side of the first surface in an area inside the outer circumferential portion, and a plurality of concave portions that are concave on the side of the first surface in an area inside the convex portion.

12 Claims, 15 Drawing Sheets

(56)         References Cited

OTHER PUBLICATIONS

Shigeto et al. (JPWO 2014-106924 A1); Jan. 19, 2017 (EPO machine translation to English). (Year: 2017).*
Koichiro Saito et al., "Complex shape demonstrator," CAMX2022, Oct. 17, 2022, 3 pages (note area in red).

* cited by examiner

REINFORCING MEMBER, STRUCTURAL MEMBER, AND METHOD OF MANUFACTURING THE SAME

RELATED APPLICATION

Priority is claimed to Japanese Patent Application No. 2022-200051, filed on Dec. 15, 2022, the entire content of which is incorporated herein by reference.

BACKGROUND

1. Field of the Disclosure

The present disclosure relates to a reinforcing member, a structural member, and a method of manufacturing the same.

2. Description of the Related Art

In recent years, structural members in which a fiber-reinforced resin is used have been adopted to reduce the weight of automobiles and aircraft. For example, aircraft parts are formed by heating and pressure molding a prepreg produced by impregnating a reinforcement fiber with a resin. A method is proposed that forms a partial incision in a continuous fiber included in a prepreg to configure an open incision in which the incision is open in order to pressure mold a complex three-dimensional structure from a plate-shaped prepreg (see, for example, JP2020-55447). In the related art described above, there is concern that the strength is reduced by forming an incision in the continuous fiber.

SUMMARY

The present disclosure addresses the issue described above, and a purpose thereof is to provide a lightweight and highly rigid structural member.

A reinforcing member according to an embodiment of the present disclosure includes a plate-shaped member that is made of a fiber-reinforced resin in which a continuous fiber is used as a reinforcement fiber and that has a first surface and a second surface, the plate-shaped member including: an outer circumferential portion that defines an outer edge of the plate-shaped member; a convex portion that is convex on a side of the first surface in an area inside the outer circumferential portion; and a plurality of concave portions that are concave on the side of the first surface in an area inside the convex portion.

Another embodiment of the present invention relates to a structural member. The structural member includes: the reinforcing member according to the embodiment; and a main body member joined to the outer circumferential portion of the reinforcing member and to a bottom portion of each of the plurality of concave portions, wherein a cavity is provided between the reinforcing member and the main body member.

Still another embodiment of the present invention relates to a manufacturing method. The method includes: providing a prepreg sheet, produced by impregnating a continuous fiber with a resin, on a mold for molding a plate-shaped member, the plate-shaped member including an outer circumferential portion that defines an outer circumference of the plate-shaped member having a first surface and a second surface, a convex portion that is convex on the side of the first surface in an area inside the outer circumferential portion, and a plurality of concave portions that are concave on the side of the first surface in an area inside the convex portion; and heating and pressurizing the prepreg sheet by using the mold to mold the plate-shaped member made of a fiber-reinforced resin.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which.

DETAILED DESCRIPTION

Figure 1:
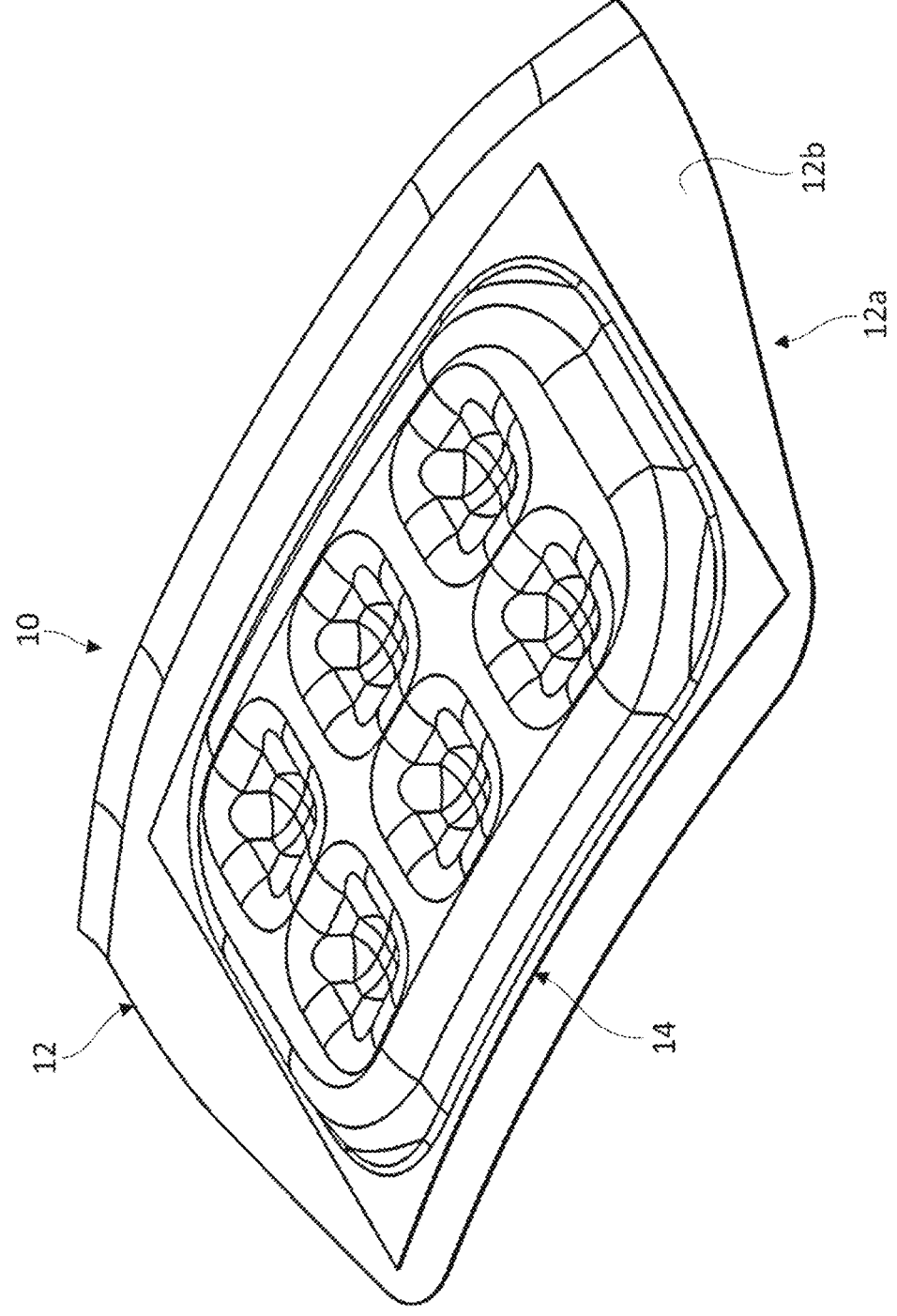
FIG. 1 is a perspective view schematically showing the configuration of the structural member according to the embodiment.

The invention will now be described by reference to the preferred embodiments. This does not intend to limit the scope of the present invention, but to exemplify the invention.

A description will be given of an embodiment of the present invention with reference to the drawings. The same numerals are used in the description to denote the same elements, and a duplicate description is omitted as appropriate. To facilitate the understanding, the relative dimensions of the constituting elements in the drawings do not necessarily mirror the actual relative dimensions.

FIG. 1 is a perspective view schematically showing the configuration of the structural member 10 according to the embodiment. The structural member 10 is a blocker door attached to the outer circumference of an aircraft engine.

The blocker door is a movable member for blocking the bypass airflow of the engine to reverse the thrust. In the embodiment, the structural member 10 is exemplified by a blocker door, but the application of the structural member 10 according to this embodiment is not particularly limited. A reinforcing member 14 according to this embodiment may be applied to a structural member of any shape and application.

The structural member 10 includes a main body member 12 and a reinforcing member 14. The main body member 12 is a plate-shaped member and has a front surface 12a that the bypass airflow collides against during reverse thrust and a back surface 12b opposite to the front surface 12a. The main body member 12 has a gently curved shape as a whole. The main body member 12 is a plate-shaped member having a small thickness and so could easily undergo deformation (for example, flexing) due to a load applied to the front surface 12a. The reinforcing member 14 is attached to the back surface 12b of the main body member 12 to suppress deformation (for example, flexing) of the front surface 12a of the main body member 12 and increase the rigidity of the main body member 12. The reinforcing member 14 is a plate-shaped member in which concavities and convexities are formed, and the concave-convex shape suppresses deformation (for example, flexing).

Conventionally, a sandwich panel having a honeycomb core is used as a lightweight and highly rigid structural member. A honeycomb core is expensive itself as a material and requires high cost to process also because it is not easy to process it into a desired shape. In this embodiment, the main body member 12 and the reinforcing member 14 are made of a fiber-reinforced resin (FRP; Fiber Reinforced Plastics), and the reinforcing member 14 is joined to the main body member 12, thereby realizing a lightweight and highly rigid structural member 10 without using a honeycomb core.

Figure 2:
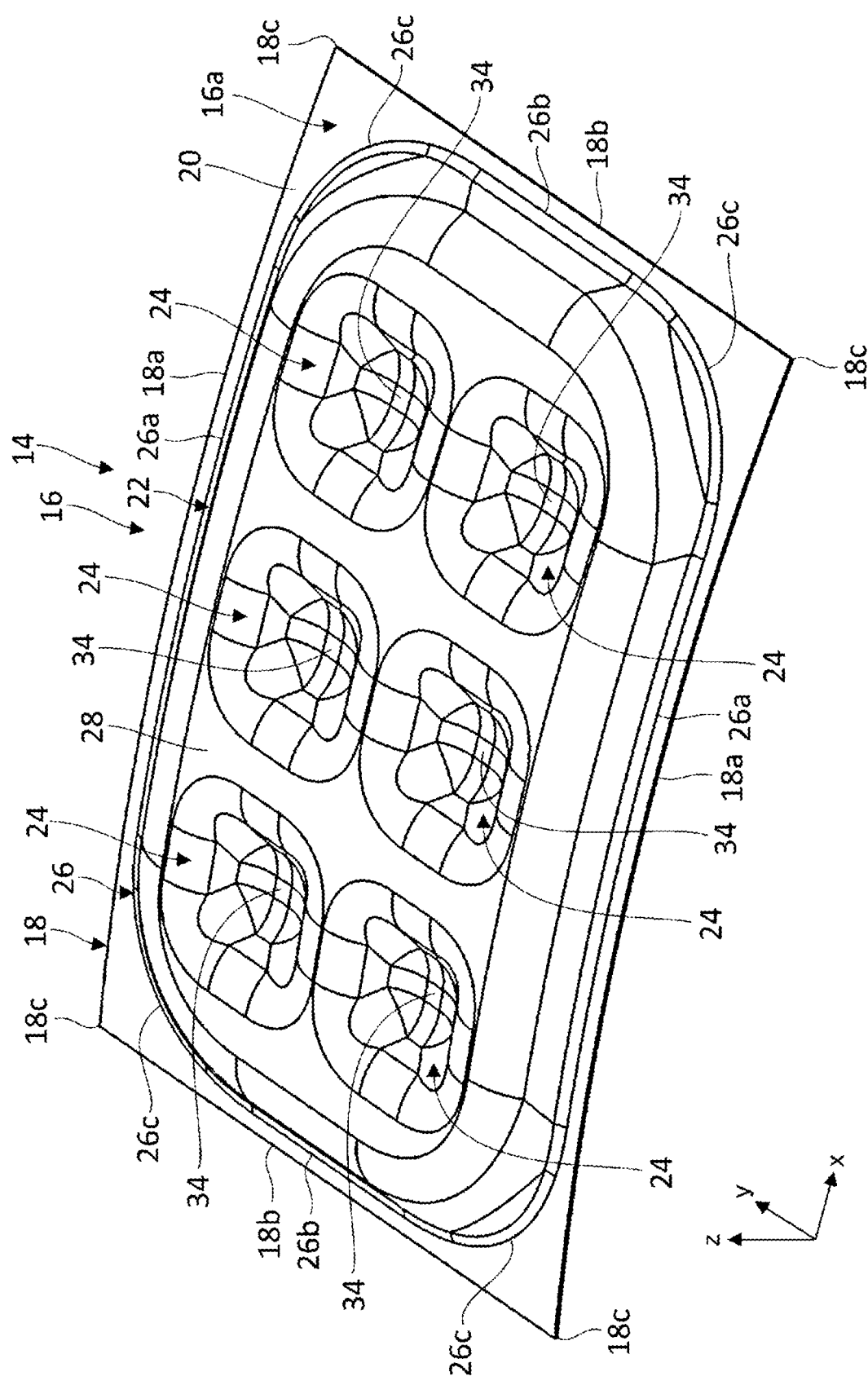
FIG. 2 is a perspective view schematically showing the configuration of the reinforcing member according to the embodiment.
Figure 3:
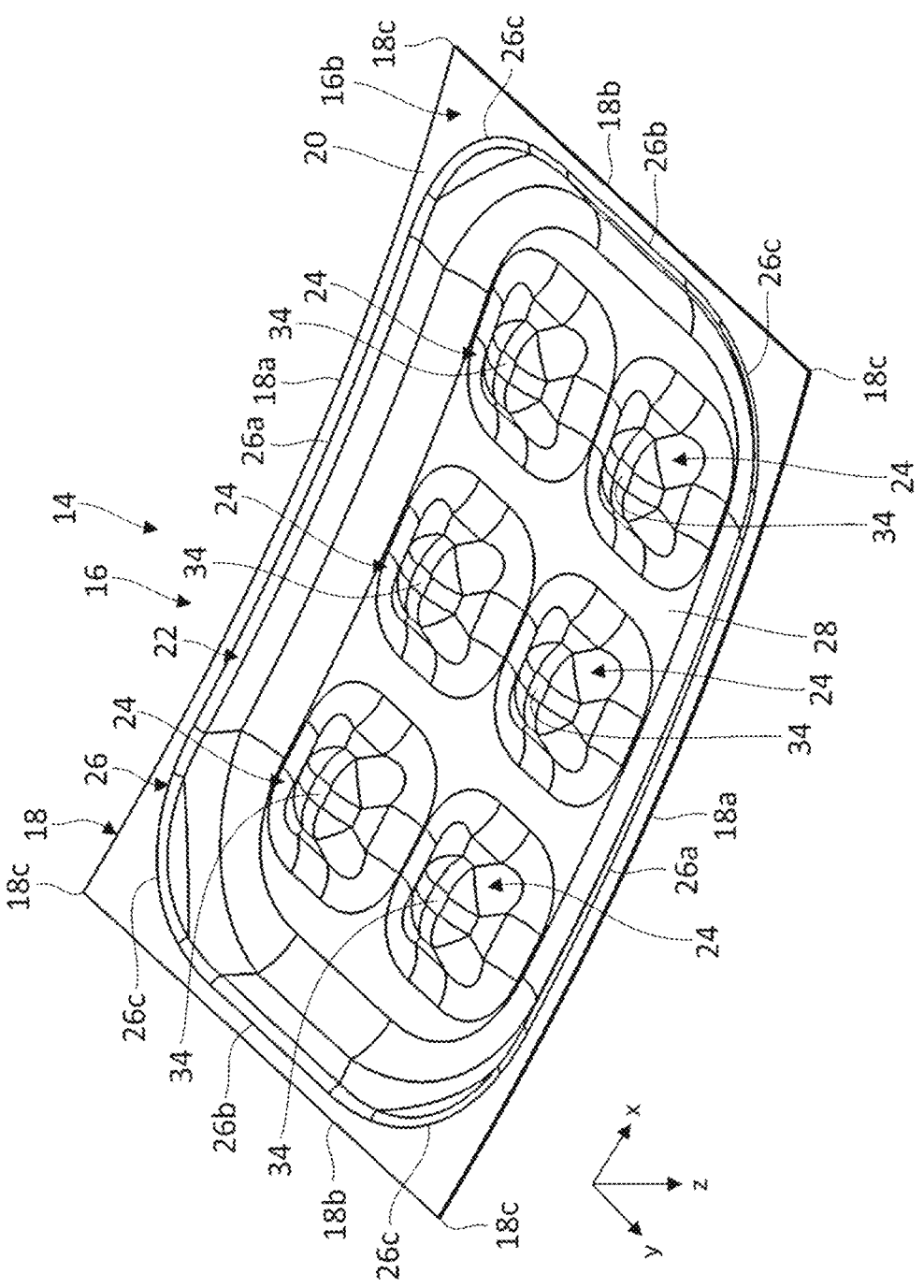
FIG. 3 is a perspective view schematically showing the configuration of the reinforcing member according to the embodiment.
Figure 4:
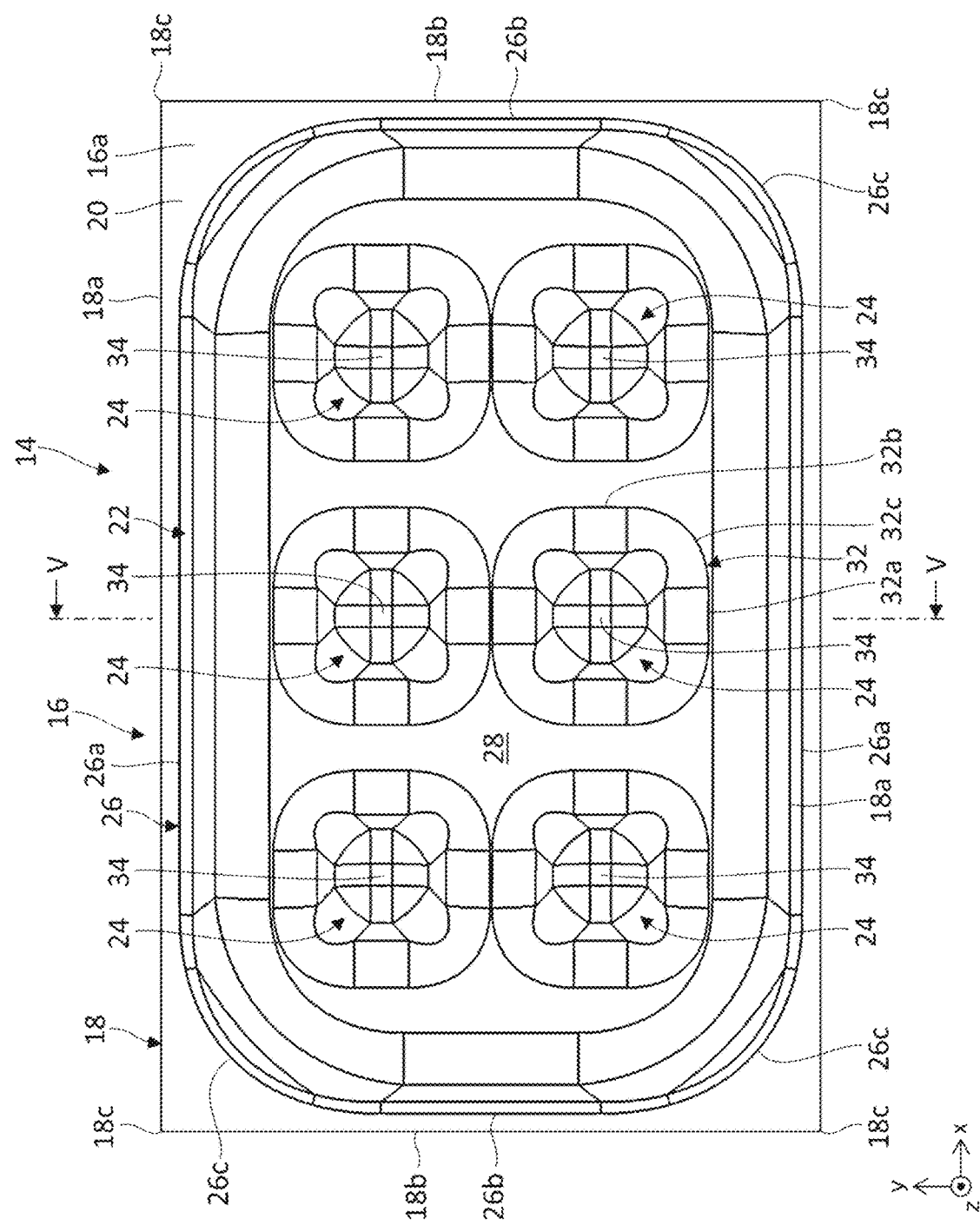
FIG. 4 is a top view schematically showing the configuration of the reinforcing member according to the embodiment.
Figure 5:
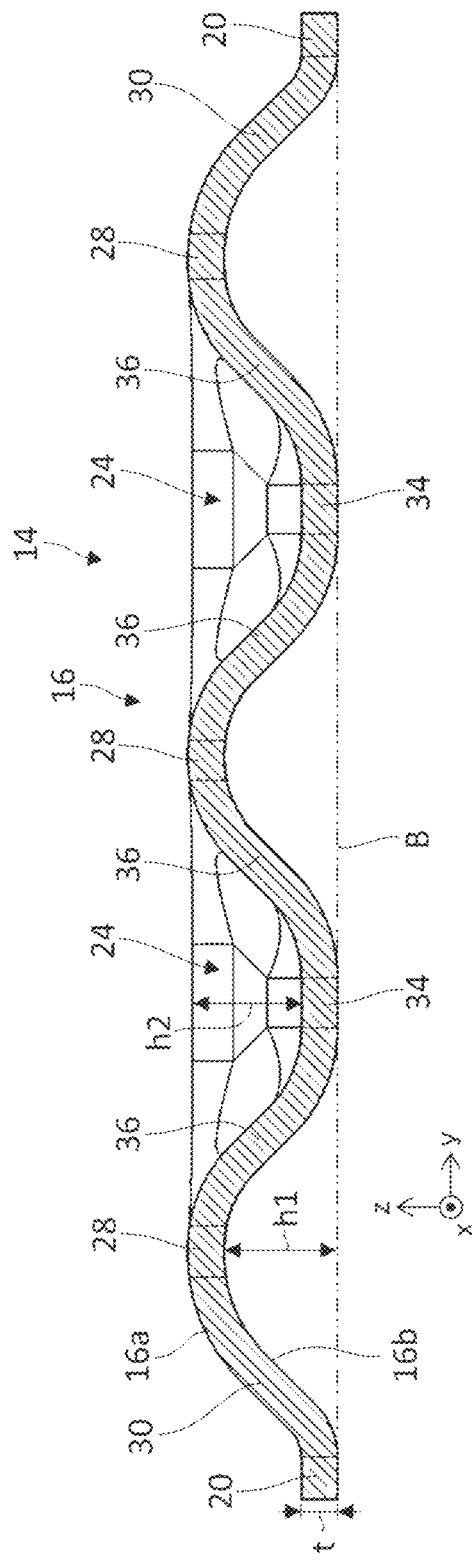
FIG. 5 is a lateral cross-sectional view schematically showing the configuration of the reinforcing member according to the embodiment.

FIGS. 2-5 schematically show the configuration of the reinforcing member 14 according to the embodiment. The reinforcing member 14 is formed by a plate-shaped member 16 in which concavities and convexities are formed. The plate-shaped member 16 has a first surface 16a and a second surface 16b opposite to the first surface 16a. FIG. 2 is a perspective view of the first surface 16a, and FIG. 3 is a perspective view of the second surface 16b. FIG. 4 is a top view of the first surface 16a. FIG. 5 is a lateral cross-sectional view corresponding to the V-V cross-section of FIG. 4.

In the drawings, the thickness direction of the reinforcing member 14 is defined as the z direction, the longitudinal direction of the reinforcing member 14 is defined as the x direction, and the direction orthogonal to the x direction and the z direction is defined as the y direction. These directions are set to help understand the embodiment and do not limit the directions during manufacturing or use of the structural member 10 or the reinforcing member 14. In addition, inflections of the concave-convex shape are denoted in the drawings by solid lines solids line so as to illustrate the concave-convex shape in an easy-to-understand manner.

The shape of the outer edge 18 of the plate-shaped member 16 is, for example, a quadrangle and is, for example, a rectangle. The outer edge 18 of the plate-shaped member 16 has a long side 18a extending in the longitudinal direction (for example, the x direction), a short side 18b extending in a direction that intersects the longitudinal direction (for example, the y direction), and a corner portion 18c provided between the long side 18a and the short side 18b. The shape of the outer edge 18 of the plate-shaped member 16 is not particularly limited and may be a trapezoid, a rhombus, or a parallelogram, or any polygon like a triangle, a pentagon, or a hexagon. The corner portions 18c of the plate-shaped member 16 may be cut. The corner portion 18c may be cut in a straight line or may be cut in an arc shape.

The plate-shaped member 16 is configured to have a uniform thickness t (see FIG. 5) as a whole. The thickness t of the plate-shaped member 16 is not particularly limited but is, for example, 0.5 mm or more and 10 mm or less and is, preferably, 1 mm or more and 5 mm or less.

The plate-shaped member 16 includes an outer circumferential portion 20, a convex portion 22, and a plurality of concave portions 24.

The outer circumferential portion 20 is a portion that defines the outer edge 18 of the plate-shaped member 16. The outer circumferential portion 20 has a frame shape or a closed loop shape aligned with the outer edge 18 of the plate-shaped member 16. The outer circumferential portion 20 is a portion that has less shape change in the thickness direction than the convex portion 22 and the plurality of concave portions 24. The outer circumferential portion 20 is a portion joined to the back surface 12b of the main body member 12 and has a shape aligned with the back surface 12b of the main body member 12. In the case the back surface 12b of the main body member 12 has a gently curved shape, the outer circumferential portion 20 has a gently curved shape as a whole. In the case the back surface 12b of the main body member 12 is flat, the outer circumferential portion 20 has a flat shape as a whole.

The convex portion 22 is formed inside the outer circumferential portion 20. The convex portion 22 is formed in an area inside an area in which the outer circumferential portion 20 is formed in a planar view of the first surface 16a (see FIG. 4). The convex portion 22 is a portion that protrudes in the thickness direction with respect to the outer circumferential portion 20. The convex portion 22 is formed such that it protrudes on the side of the first surface 16a and that the first surface 16a is convex and the second surface 16b is concave. The convex portion 22 is, for example, formed to occupy a major portion of the plate-shaped member 16. The area S1 surrounded by the outer edge 26 of the convex portion 22 is 50% or more and is, preferably, 70% or more or 80% or more of the area S surrounded by the outer edge 18 of the plate-shaped member 16.

The outer edge 26 of the convex portion 22 includes a first section 26a extending in the longitudinal direction (for example, the x direction) along the long side 18a, a second section 26b extending in a direction that intersects the longitudinal direction (for example, the y direction) along the short side 18b, and a third section 26c extending in an arc shape between the first section 26a and the second section 26b. The radius of curvature of the third section 26c is larger than the radius of curvature of the corner portion 18c of the plate-shaped member 16. In the illustrated example, the outer edge 26 of the convex portion 22 has a shape in which the four corners of the quadrangle are arc-shaped.

An apex portion 28 of the convex portion 22 is configured such that the height h1 in the thickness direction from the outer circumferential portion 20 (see FIG. 5) is constant. In the case the outer circumferential portion 20 is flat, the apex portion 28 is also configured to be flat. In the case the outer circumferential portion 20 is gently curved, the apex portion 28 is also configured to be gently curved. The height h1 in the thickness direction from the outer circumferential portion 20 to the apex portion 28 is preferably 50 mm or less and is, more preferably 30 mm or less. The height h1 in the thickness direction from the outer circumferential portion 20 to the apex portion 28 is preferably larger than the thickness t of the plate-shaped member 16 and is, for example, 5 mm or more, or, for example, 10 mm or more.

An outer sloped portion 30 (see FIG. 5) is provided between the outer circumferential portion 20 and the apex portion 28. The outer sloped portion 30 is formed such that the height increases monotonically from the outer circumferential portion 20 toward the apex portion 28. Preferably, the outer sloped portion 30 is formed such that the slope does not change abruptly from the outer circumferential portion 20 toward the apex portion 28 and is formed only by a smooth curved surface. The outer sloped portion 30 is formed by, for example, a smooth curve having a radius of curvature of 20 mm or more or 30 mm or more in a cross-sectional view orthogonal to the outer edge 18 of the plate-shaped member 16.

The plurality of concave portions 24 are formed inside the convex portion 22. The plurality of concave portions 24 are formed in an area inside than the outer edge 26 of the convex portion 22 in a planar view of the first surface 16a (see FIG. 4). The plurality of concave portions 24 are, for example, formed in an area inside the outer edge of the apex portion 28 in the planar view of the first surface 16a (see FIG. 4). The plurality of concave portions 24 are formed so as to be concave in the thickness direction with respect to the apex portion 28. The plurality of concave portions 24 are formed such that they protrude on the side of the second surface 16b side, the first surface 16a is concave, and the second surface 16b is convex. The plurality of concave portions 24 are arranged in a lattice shape in the apex portion 28. The plurality of concave portions 24 are arranged in the longitudinal direction (for example, the x direction) of the plate-shaped member 16 and are also arranged in a direction that intersects the longitudinal direction (for example, the y direction). The plurality of concave portions 24 may be arranged in a radial shape in the apex portion 28.

The outer edge 32 (see FIG. 4) of each of the plurality of concave portions 24 includes a first section 32a extending in the longitudinal direction (for example, the x direction) along the long side 18a, a second section 32b extending in a direction that intersects the longitudinal direction (for example, the y direction) along the short side 18b, and a third section 32c extending in an arc shape between the first section 32a and the second section 32b. The radius of curvature of the third section 32c is larger than the radius of curvature of the corner portion 18c of the plate-shaped member 16. In the illustrated example, the outer edge 32 of the concave portion 24 has a shape in which the four corners of the quadrangle are arc-shaped. The size of the outer edge 32 of each of the plurality of concave portions 24 in the longitudinal direction (for example, the x direction) is about the same as the size in a direction that intersects the longitudinal direction (for example, the y direction). That is, the length of the first section 32a is about the same as the length of the second section 32b and is, for example, about 0.8 times-1.2 times the length of the second section 32b.

A bottom portion 34 of each of the plurality of concave portions 24 is a portion joined to the back surface 12b of the main body member 12. The bottom portion 34 is configured such that the depth h2 (see FIG. 5) in the thickness direction from the apex portion 28 is constant. In the case the outer circumferential portion 20 is flat, the bottom portion 34 of each of the plurality of concave portions 24 is configured to be located on a virtual plane B (see FIG. 5) defined by the outer circumferential portion 20. In the case the outer circumferential portion 20 is gently curved, the bottom portion 34 of each of the plurality of concave portions 24 is configured to be located on a curved surface defined by the outer circumferential portion 20. The height h2 in the thickness direction from the apex portion 28 to the bottom portion 34 is preferably 50 mm or less and is, more preferably, 30 mm or less. The height h2 in the thickness direction from the apex portion 28 to the bottom portion 34 is, for example, 5 mm or more and is, for example, 10 mm or more.

The bottom portion 34 of each of the plurality of concave portions 24 has a shape of a quadrangle or a shape produced by rounding the four corners of a quadrangle. By shaping the bottom portion 34 in a square or in a shape approximating a square, the area occupied by the bottom portion 34 is increased as compared to the case where the bottom portion 34 is circular. This increases the area of joint between the main body member 12 and the apex portion and increases the joint strength of the main body member 12 and the reinforcing member 14.

An inner sloped portion 36 (see FIG. 5) is provided between the apex portion 28 and the bottom portion 34. The inner sloped portion 36 is formed such that the height increases monotonically from the bottom portion 34 toward the apex portion 28. Preferably, the inner sloped portion 36 is formed such that the slope does not change abruptly from the bottom portion 34 toward the apex portion 28 and is formed only by a smooth curved surface. The inner sloped portion 36 is configured by, for example, a smooth curve having a radius of curvature of 20 mm or more or 30 mm or more in a cross-sectional view orthogonal to the outer edge 18 of the plate-shaped member 16.

Figure 6:
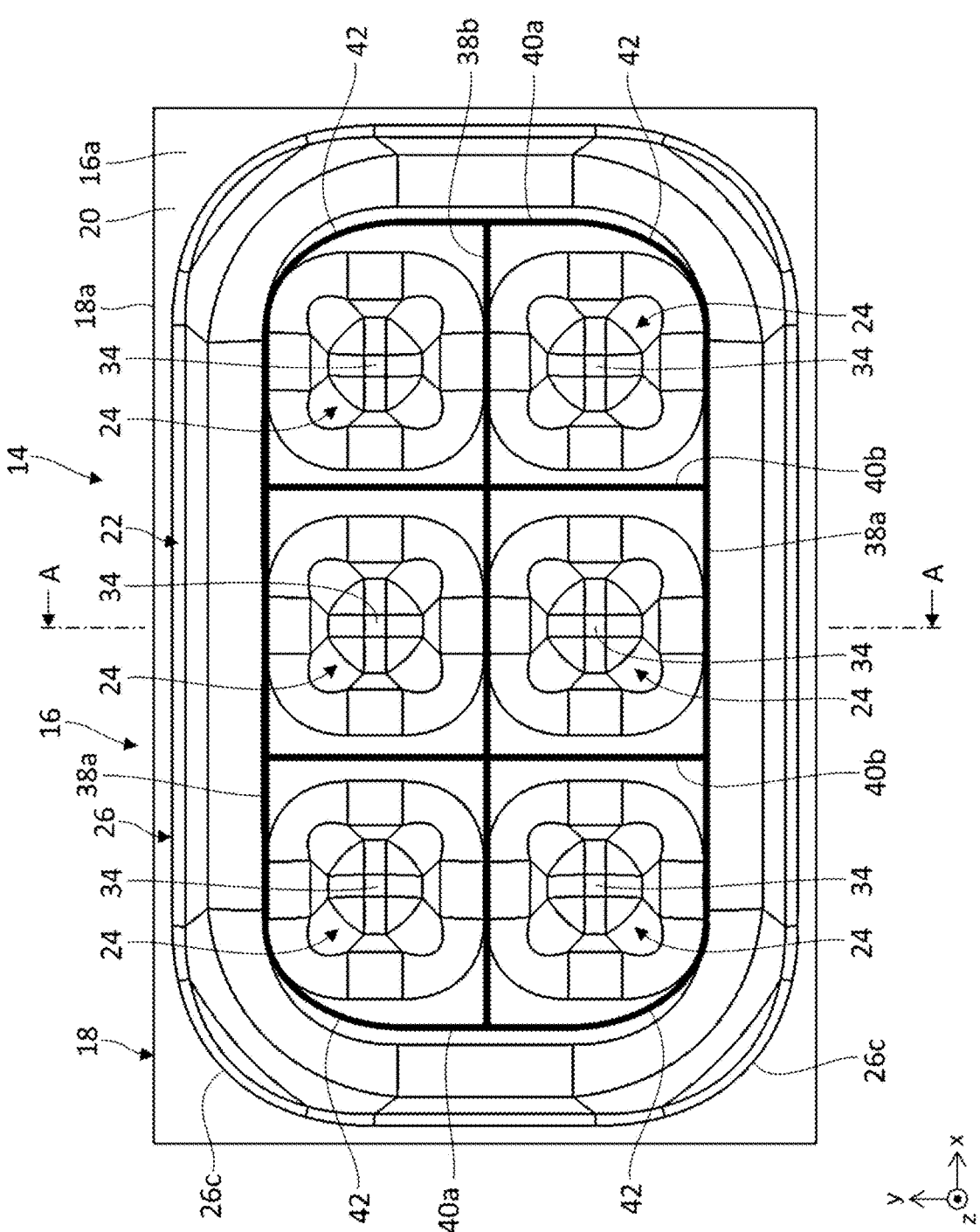
FIG. 6 is a top view schematically showing the lattice frame shape of the apex portion.

By arranging the plurality of concave portions 24 in a lattice shape, the apex portion 28 has a lattice frame shape that surrounds the outer edge 32 of the plurality of concave portions 24. FIG. 6 is a top view schematically showing the lattice frame shape of the apex portion 28, and the lattice frame shape of the apex portion 28 is schematically shown by a thick line. The apex portion 28 includes a plurality of first beams 38a, 38b extending in the longitudinal direction (for example, the x direction), a plurality of second beams 40a, 40b extending in a direction that intersects the longitudinal direction (for example, the y direction), and a plurality of corner portions 42 extending in an arc shape. The plurality of first beams 38a, 38b include an outer first beam 38a located outside the plurality of concave portions 24 and an inner first beam 38b located between the plurality of concave portions 24. The plurality of second beams 40a, 40b include an outer second beam 40a located outside the plurality of concave portions 24 and an inner second beam 40b located between the plurality of concave portions 24. The outer first beam 38a and the outer second beam 40a are connected by the corner portion 42 extending in an arc shape. The ends of the inner first beam 38b are connected to the outer second beam 40a. The ends of the inner second beam 40b are connected to the outer first beam 38a. The lattice frame shape of the apex portion 28 formed by the first beams 38a, 38b, the second beams 40a, 40b, and the corner portions 42 makes it possible to address load changes in both the longitudinal direction (for example, the x direction) and a direction that intersects the longitudinal direction (for example, the y direction).

The reinforcing member 14 is made of a fiber-reinforced resin and is made of, for example, a thermoplastic fiber-reinforced resin. The reinforcing member 14 is formed by heating and pressurizing, using a mold, a prepreg sheet formed by impregnating the reinforcement fiber with a resin. Carbon fiber, glass fiber or aramid fiber may be used as the reinforcement fiber. The reinforcement fiber is preferably a continuous fiber without a joined or cut part, and it is preferable to use a reinforcement fiber that extends continuously along the concave-convex shape of the plate-shaped member 16. Engineering plastics such as polyetheretherketone (PEEK) and polyetherketone ketone (PEKK) may be used as the thermoplastic resin with which the reinforcement fiber is impregnated. The main body member 12 may also be made of the same fiber-reinforced resin as the reinforcing member 14 and may be made of the same thermoplastic fiber-reinforced resin as that of the reinforcing member 14. The main body member 12 or the reinforcing member 14 may be made of a thermosetting fiber-reinforced resin. In this case, an epoxy resin or the like may be used as the thermosetting resin with which the reinforcement fiber is impregnated.

Figures 7A, 7B:
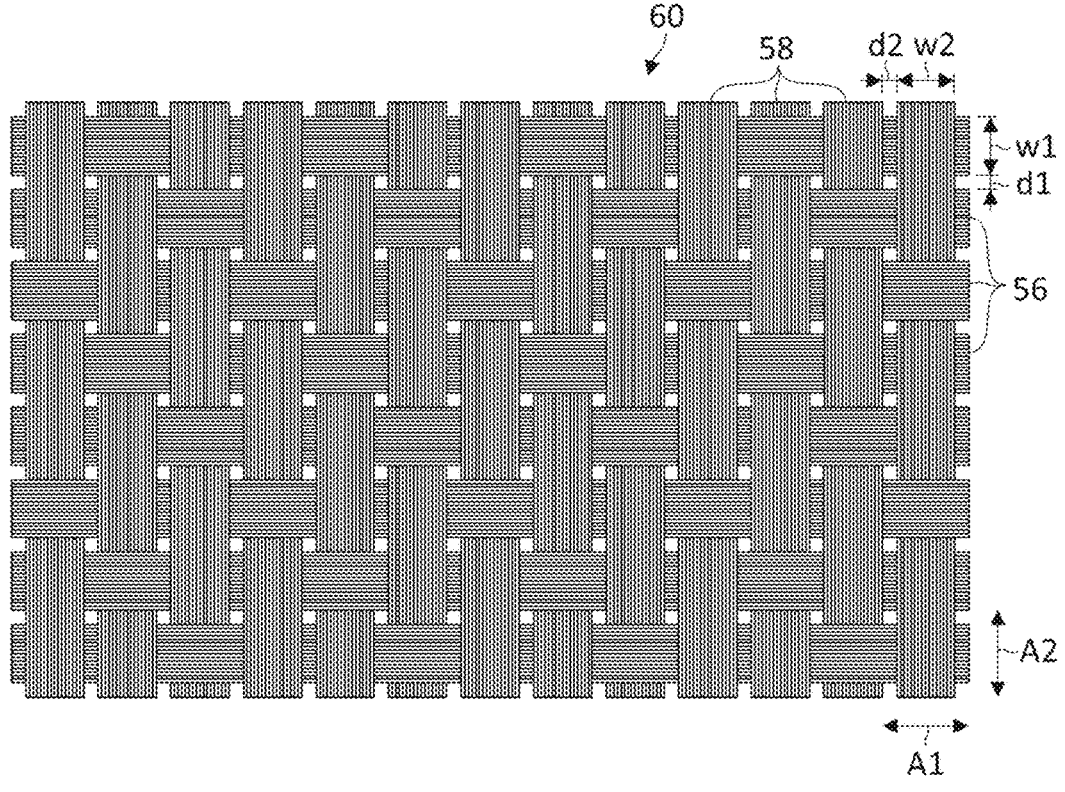
FIGS. 7A, 7B schematically show a method of forming a prepreg sheet.

FIGS. 7A, 7B schematically show a method of forming a prepreg sheet. FIG. 7A shows a prepreg tape 50 used to form a prepreg sheet. The prepreg tape 50 is comprised of a plurality of reinforcement fibers 52 oriented in one direction and impregnated with a thermoplastic resin 54. The plurality of reinforcement fibers 52 are oriented so as to extend in the longitudinal direction A of the prepreg tape 50. The thermoplastic resin 54 fills the gap between the plurality of reinforcement fibers 52 and fixes a fiber bundle composed of a plurality of reinforcement fibers 52 so that the relative positions of the plurality of reinforcement fibers 52 do not change. The width w of the prepreg tape 50 is not particularly limited and is, for example, 1 mm or more and 20 mm or less and is, for example, 2 mm or more and 10 mm or less. The length L of the prepreg tape 50 is larger than the outer size of the reinforcing member 14 and is, for example, 0.5 m or more or 1 m or more. The thickness of the prepreg tape 50 is, for example, 0.1 mm or more and 2 mm or less and is, for example, 0.2 mm or more and 1 mm or less.

FIG. 7B shows a prepreg sheet 60 formed by using the prepreg tape 50. The prepreg sheet 60 is formed by weaving a plurality of first prepreg tapes 56 extending in a first direction A1 and a plurality of second prepreg tapes 58 extending in a second direction A2 that intersects the first direction A1. Each of the first prepreg tape 56 and the second prepreg tape 58 is configured in the same manner as the prepreg tape 50 shown in FIG. 7a. In the prepreg sheet 60 shown in FIG. 7B, the first direction A1 and the second direction A2 are orthogonal. That is, given that the first direction A1 is the 0-degree direction, the second direction A2 is the 90-degree direction.

There is a first gap d1 between the plurality of first prepreg tapes 56. The first gap d1 is smaller than the width w1 of the first prepreg tape 56. The first gap d1 is, for example, 1% or more and 50% or less of the width w1 of the first prepreg tape 56 and is, preferably, 5% or more and 25% or less. Similarly, there is a second gap d2 between the plurality of second prepreg tapes 58. The second gap d2 is smaller than the width w2 of the second prepreg tape 58. The second gap d2 is, for example, 1% or more and 50% or less and is, preferably, 5% or more and 25% or less of the width w2 of the second prepreg tape 58. The width w1 of the first prepreg tape 56 may be the same as or different from the width w2 of the second prepreg tape 58. The first gap d1 may be the same as or different from the second gap d2.

The prepreg sheet 60 is not fixed in an area between the first prepreg tape 56 and the second prepreg tape 58 intersecting each other. Therefore, the plurality of first prepreg tapes 56 are configured such that they are displaceable with respect to each other and the first gap d1 is variable in the second direction A2. Similarly, the plurality of second prepreg tapes 58 are configured such that they are displaceable with respect to each other and the second gap d2 is variable in the first direction A1.

The resin weight content (wt %) of the prepreg sheet 60 is 50% or less and is, for example, 40% or less, 35% or less, 30% or less, or 25% or less. By lowering the resin weight content of the prepreg sheet 60, the rigidity of the reinforcing member 14 is increased. The resin weight content (wt %) of the prepreg tape 50 forming the prepreg sheet 60 may be equivalent to the resin weight content of the prepreg sheet 60 and is 50% or less and may be, for example, 40% or less, 35% or less, 30% or less, or 25% or less.

In the prepreg sheet 60 shown in FIG. 7B, the first prepreg tape 56 and the second prepreg tape 58 are woven in twill weave. The method of weaving the prepreg sheet is not limited to twill weave, and a prepreg sheet may be formed by using any desirable weaving method such as plain weave or sateen weave. Further, the prepreg sheet may be woven by using prepreg tapes extending in three or more directions. For example, the prepreg sheet may be woven by a plurality of first prepreg tapes extending in a first direction (for example, the 0-degree direction), a plurality of second prepreg tapes extending in a second direction (for example, the +60-degree direction) that intersects the first direction, and a plurality of third prepreg tapes extending in a third direction (for example, the −60-degree direction) that intersects the first and second directions.

The prepreg sheet may be woven without using a prepreg tape produced by impregnating a unidirectional fiber with a resin. The prepreg sheet may be formed by, for example, impregnating the entire continuous fiber sheet woven by using continuous fibers with a thermoplastic resin. For example, a plurality of first continuous fibers extending in a first direction (for example, the 0-degree direction) and a plurality of second continuous fibers extending in a second direction (for example, the 90-degree direction) that intersects the first direction may be woven in plain weave, twill weave, sateen weave, or the like to form a continuous fiber sheet. The prepreg sheet may be formed by impregnating such a continuous fiber sheet with a thermoplastic resin. In this case, the prepreg sheet is fixed by a resin in an area between the first and second continuous fibers intersecting each other.

Figure 8:
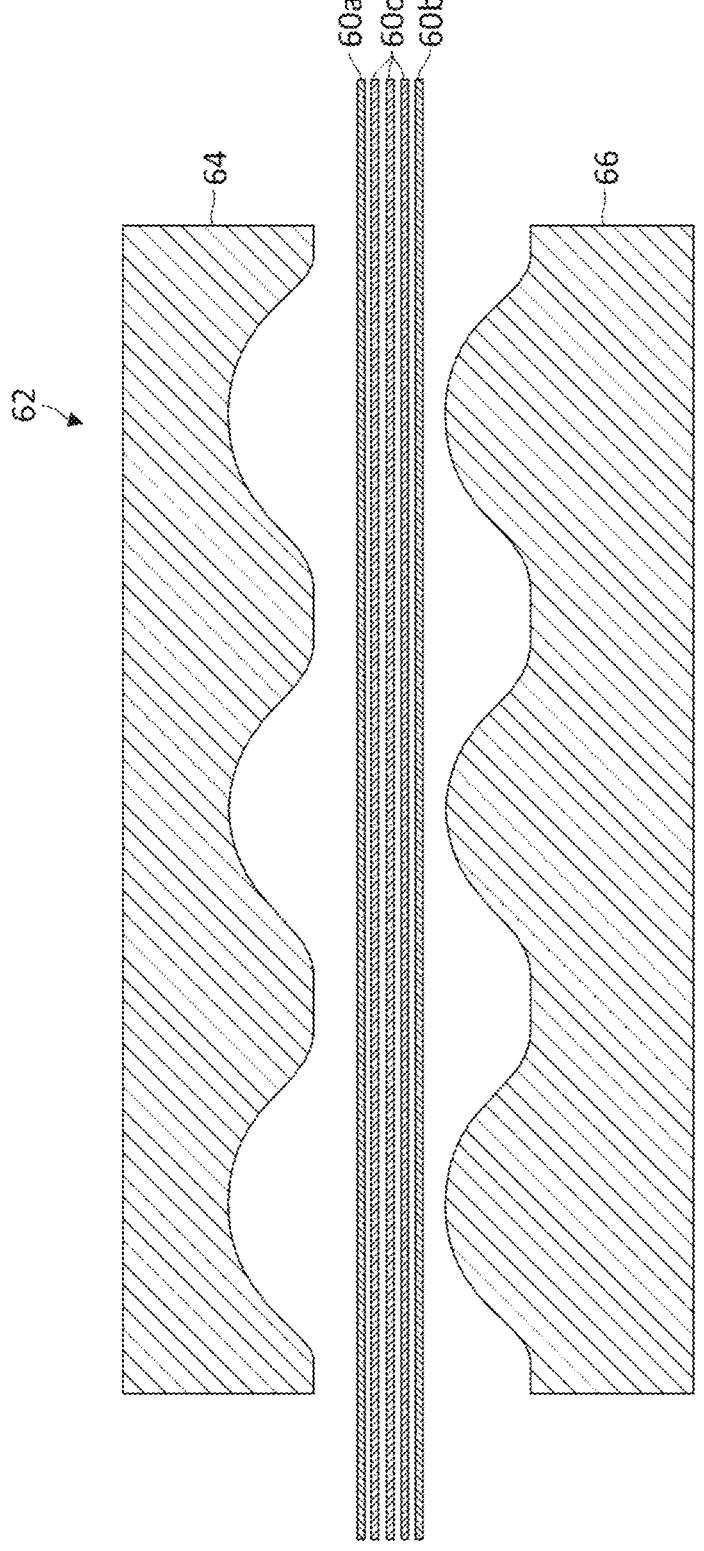
FIG. 8 schematically shows a method of molding the reinforcing member according to the embodiment.

FIG. 8 schematically shows a method of molding the reinforcing member 14 according to the embodiment. A mold 62 for forming the reinforcing member 14 is prepared, and a plurality of prepreg sheets 60a, 60b, 60c are stacked and arranged between an upper mold 64 and a lower mold 66 of the mold 62. The upper mold 64 has a concave-convex shape corresponding to the first surface 16a of the plate-shaped member 16, and the lower mold 66 has a concave-convex shape corresponding to the second surface 16b of the plate-shaped member 16. The relative positions of the upper mold 64 and the lower mold 66 in the vertical direction does not matter, and they may be used upside down.

Each of the plurality of prepreg sheets 60a-60c is configured in the same manner as the prepreg sheet 60 shown in FIG. 7B. The plurality of prepreg sheets 60a-60c include a first prepreg sheet 60a, a second prepreg sheet 60b, and intermediate prepreg sheets 60c. The first prepreg sheet 60a is a sheet in contact with the upper mold 64 and constitutes the first surface 16a of the plate-shaped member 16. The second prepreg sheet 60b is a sheet in contact with the lower mold 66 and constitutes the second surface 16b of the plate-shaped member 16. The intermediate prepreg sheets 60c are disposed between the first prepreg sheet 60a and the second prepreg sheet 60b. In the example of FIG. 8, five prepreg sheets are stacked, and one first prepreg sheet 60a, one second prepreg sheet 60*b*, and three intermediate prepreg sheets 60*c* are stacked. The number of layers of the prepreg sheet is not particularly limited and may be 4 or less or 6 or less. The number of layers of the prepreg sheet may be appropriately set according to the thickness of the prepreg sheet and the thickness t of the reinforcing member 14 to be molded.

Figures 9A, 9B:
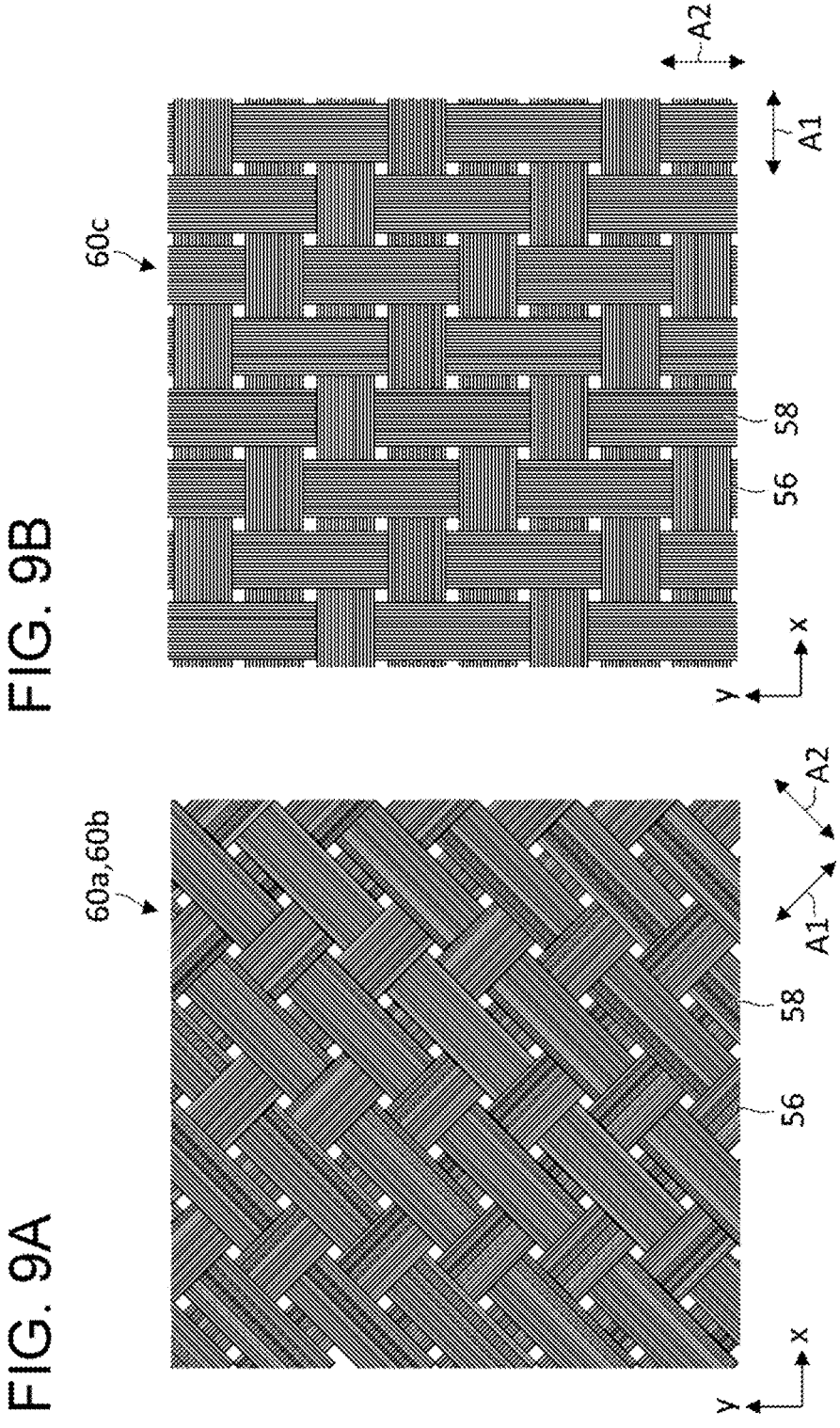
FIGS. 9A, 9B schematically show the orientation direction of the prepreg sheets.

The plurality of prepreg sheets 60*a*-60*c* may be arranged such that the orientation directions of the prepreg tapes constituting the prepreg sheets 60*a*-60*c* differ from each other. FIGS. 9A, 9B schematically show the orientation direction of the prepreg sheets 60*a*-60*c*. FIG. 9A shows the orientation directions of the first prepreg sheet 60*a* and the second prepreg sheet 60*b*. In the first prepreg sheet 60*a* and the second prepreg sheet 60*b*, the orientation directions A1, A2 of the first prepreg tape 56 and the second prepreg tape 58 are oriented at 45 degrees with respect to the longitudinal direction (for example, the x direction) of the reinforcing member 14. FIG. 9B shows the orientation direction of the intermediate prepreg sheet 60*c*. In the intermediate prepreg sheet 60*c*, the orientation direction A1 of the first prepreg tape 56 coincides with the longitudinal direction (for example, the x direction) of the reinforcing member 14. Therefore, the orientation directions A1, A2 of the intermediate prepreg sheet 60*c* are rotated 45 degrees with respect to the orientation directions A1, A2 of the first prepreg sheet 60*a* and the second prepreg sheet 60*b*.

The plate-shaped member 16 is molded by heating and pressurizing the plurality of prepreg sheets 60*a*-60*c* between the upper mold 64 and the lower mold 66 shown in FIG. 8. The plurality of prepreg sheets 60*a*-60*c* of FIG. 8 are heated to a temperature equal to or higher than the melting point of the thermoplastic resin 54 by the upper mold 64 and the lower mold 66 equipped with a heater. The plurality of prepreg sheets 60*a*-60*c* are integrated by heating and pressurization by the mold 62 and are molded into the plate-shaped member 16. Thereafter, the plate-shaped member 16 is completed by removing the plate-shaped member 16 from the mold 62. After the molding by the mold 62, parts that are unnecessary in the reinforcing member 14 may be cut from the plate-shaped member 16, or the first surface 16*a* or the second surface 16*b* of the plate-shaped member 16 may be polished.

Figure 10:
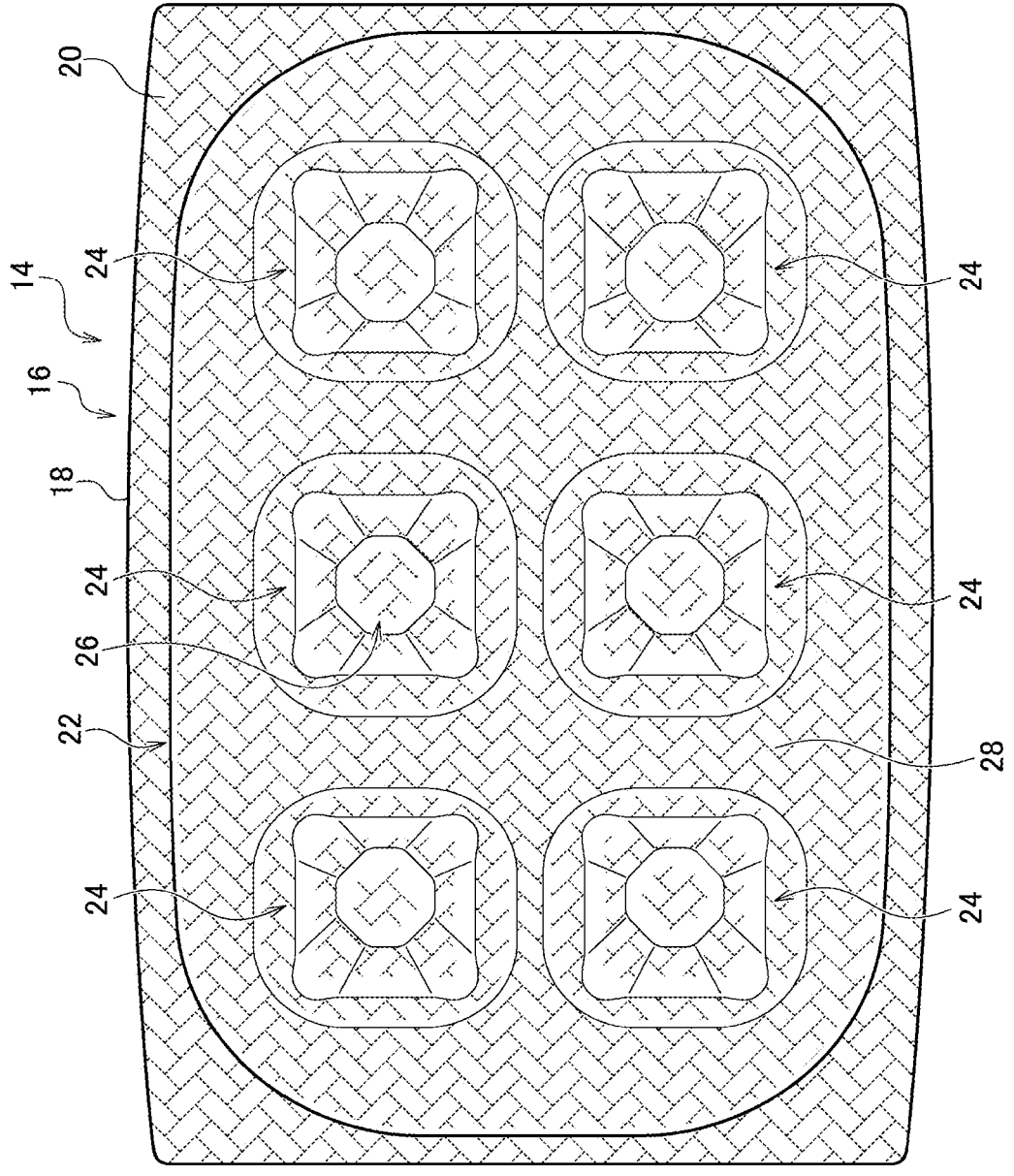
FIG. 10 is a top view showing the reinforcing member according to the embodiment.

FIG. 10 is a top view showing the reinforcing member 14 according to the embodiment. FIG. 10 shows a case of the reinforcing member 14 where carbon fiber is used as the reinforcement fiber, PEEK is used as the thermoplastic resin, and the prepreg sheets 60*a*, 60*b*, 60*c* shown in FIGS. 9A, 9B are used. As shown in FIG. 10, it can be seen that the plate-shaped member 16 having a complex concave-convex shape including the convex portion 22 and the plurality of concave portions 24 is formed. In particular, there are almost no misaligned stitches of the prepreg tape extending in the +45-degree directions over the entire plate-shaped member 16 so that the reinforcing member 14 has high rigidity over the entire plate-shaped member 16. Further, it can be seen that the bottom portion 34 of each of the plurality of concave portions 24 has a shape close to a quadrangle.

Figure 11:
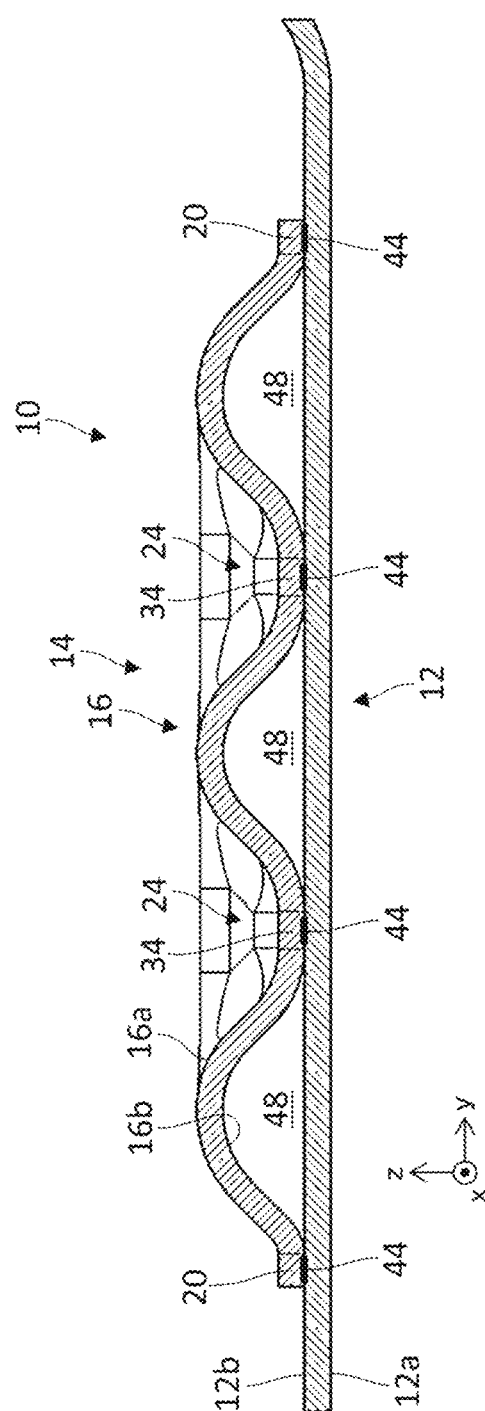
FIG. 11 schematically shows a joint between the main body member and the reinforcing member.

FIG. 11 schematically shows a joint 44 between the main body member 12 and the reinforcing member 14. The reinforcing member 14 is joined to the back surface 12*b* of the main body member 12. The reinforcing member 14 is joined to the main body member 12 by a plurality of joints 44. The plurality of joints 44 are provided between the back surface 12*b* of the main body member 12 and the second surface 16*b* of the reinforcing member 14. The plurality of joints 44 are provided on the outer circumferential portion

20 and the bottom portion 34 of the reinforcing member 14. A cavity 48 is provided between the main body member 12 and the reinforcing member 14.

The main body member 12 and the reinforcing member 14 may be joined by fusing the thermoplastic resin constituting the main body member 12 and the reinforcing member 14. In this case, the plurality of joints 44 are made of a thermoplastic resin constituting the main body member 12 and the reinforcing member 14 and are made of, for example, PEEK or PEKK. For example, the joint 44 may be formed by heating the joint portions of the main body member 12 and the reinforcing member 14 by irradiation with laser light, or heating the joint portions by ultrasonic vibration and then bringing the heated portions into contact and pressurizing and cooling the portions. The plurality of joints 44 may be adhesives. For example, the joint 44 may be formed by applying an adhesive to the main body member 12 or the reinforcing member 14, or attaching an adhesive tape to the main body member 12 or the reinforcing member 14 and then bringing the portions provided with the adhesive into contact and pressurizing the portions. The adhesive may be the same resin material as the thermoplastic resin constituting the main body member 12 and the reinforcing member 14 or may be a different material.

The main body member 12 and the reinforcing member 14 may be joined by using a fastening member such as a bolt and a rivet. For example, a through hole may be provided in the main body member 12 and the reinforcing member 14 at portions corresponding to the plurality of joints 44. A fastening member such as a bolt and a rivet may be inserted into the through hole to mechanically join the main body member 12 and the reinforcing member 14 by using the fastening member. Joint formed by the fastening member may be used instead of the joint 44 formed by a fused portion and an adhesive or may be used in combination with the joint 44 formed by a fused portion and an adhesive.

According to this embodiment, the reinforcing member 14 may be formed only by a single plate-shaped member 16 so that the structure of the reinforcing member 14 is simplified as compared to the case where a honeycomb core is used. Further, the reinforcing member 14 may be formed by molding that uses the mold 62 so that the steps of manufacturing the reinforcing member 14 is simplified as compared to the case where a honeycomb core is used. The reinforcing member 14 includes the apex portion 28 in a lattice frame shape provided with beams extending in the longitudinal direction (for example, the x direction) and a direction orthogonal to the longitudinal direction (for example, the y direction) of the reinforcing member 14. It is therefore possible to address load changes in both the longitudinal direction and a direction that intersects the longitudinal direction. As a result, the reinforcing member 14 suitably suppresses deformation of the main body member 12.

According to this embodiment, the reinforcing member 14 may be formed by reinforcement fibers continuous over the entire reinforcing member 14 so that the rigidity of the reinforcing member 14 is improved as compared to the case where an incision is provided in the middle of the reinforcement fiber. According to this embodiment, the outer sloped portion 30 and the inner sloped portion 36 are configured to be gently curved so that misalignment of stitches of the prepreg tape comprised of continuous fibers is suppressed, and the rigidity of the entire reinforcing member 14 is improved.

Figure 12:
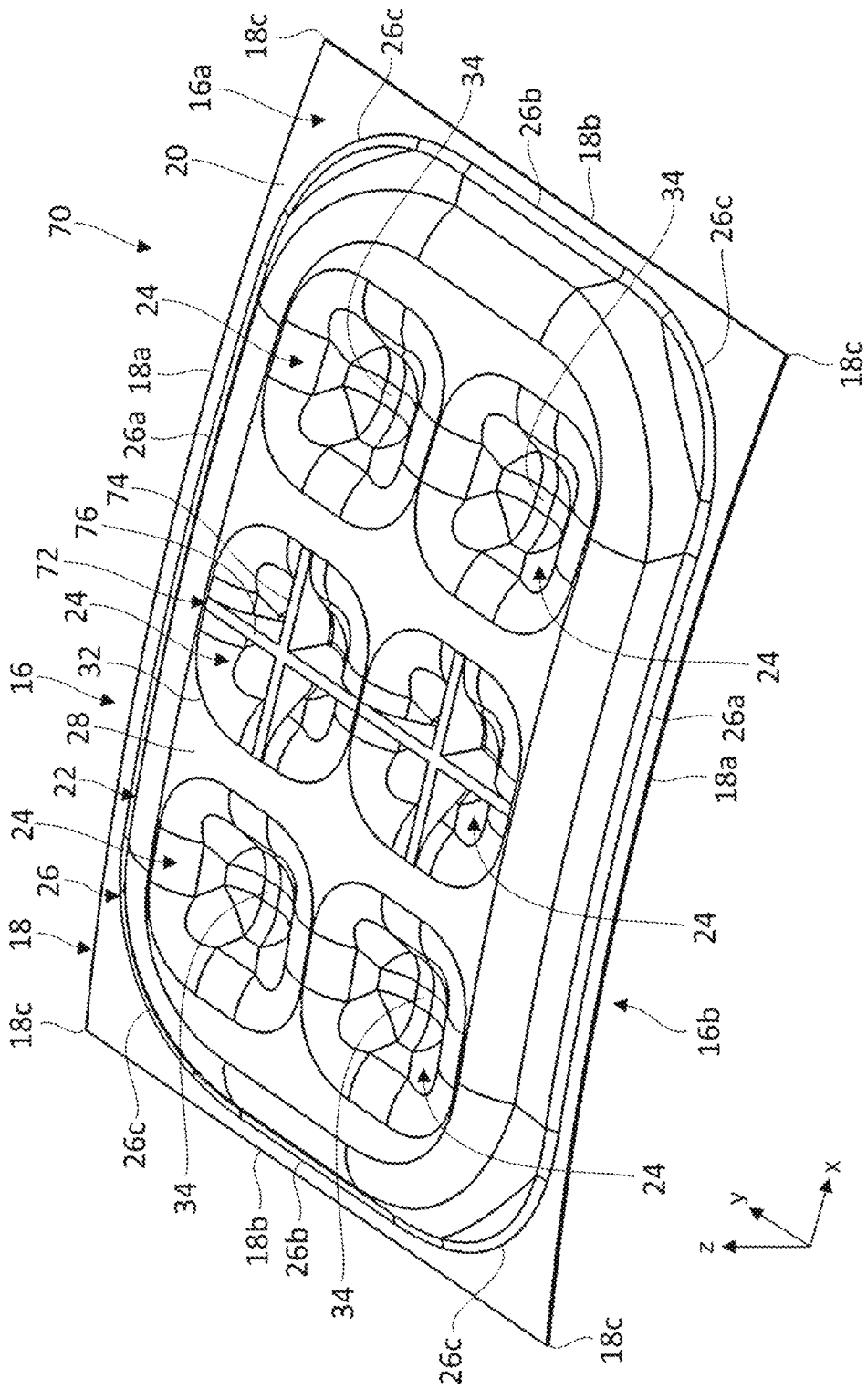
FIG. 12 is a perspective view schematically showing the configuration of the reinforcing member according to a variation.

FIG. 12 is a perspective view schematically showing the configuration of the reinforcing member 70 according to a variation and shows a view of the first surface 16*a* of the reinforcing member 70. The reinforcing member 70 differs from the above-described embodiment in that it further includes a first rib 72 provided on the first surface 16*a* of the plate-shaped member 16. The plate-shaped member 16 is configured in the same manner as in the above-described embodiment.

The reinforcing member 70 includes the plate-shaped member 16 and the first rib 72. The first rib 72 is provided on the first surface 16*a* of the plate-shaped member 16 and extends in the thickness direction from the first surface 16*a*. The first rib 72 is provided inside at least one of the plurality of concave portions 24. In the example of FIG. 12, the first rib 72 is provided inside the central concave portion 24 in the longitudinal direction (for example, the x direction). It should be noted that the first rib 72 may be provided inside any two or more of the plurality of concave portions 24 or may be provided inside all of the plurality of concave portions 24. The upper surface of the first rib 72 is configured to be flush with, for example, the apex portion 28.

The first rib 72 includes a first transverse rib 74 extending in the longitudinal direction (for example, the x direction) and a first longitudinal rib 76 extending in a direction that intersects the longitudinal direction (for example, the y direction). The ends of the first transverse rib 74 are connected to the outer edge 32 of the concave portion 24. The ends of the first longitudinal rib 76 are connected to the outer edge 32 of the concave portion 24. The first transverse rib 74 and the first longitudinal rib 76 intersect and are connected at the position of the bottom portion 34 of the concave portion 24. The first rib 72 may further include a first oblique rib (not shown) extending in an oblique direction (for example, the ±45-degree directions) with respect to the first transverse rib 74 or the first longitudinal rib 76. The first rib 72 may include any one or more ribs selected from the group consisting of the first transverse rib 74, the first longitudinal rib 76, and the first oblique rib.

Figure 13:
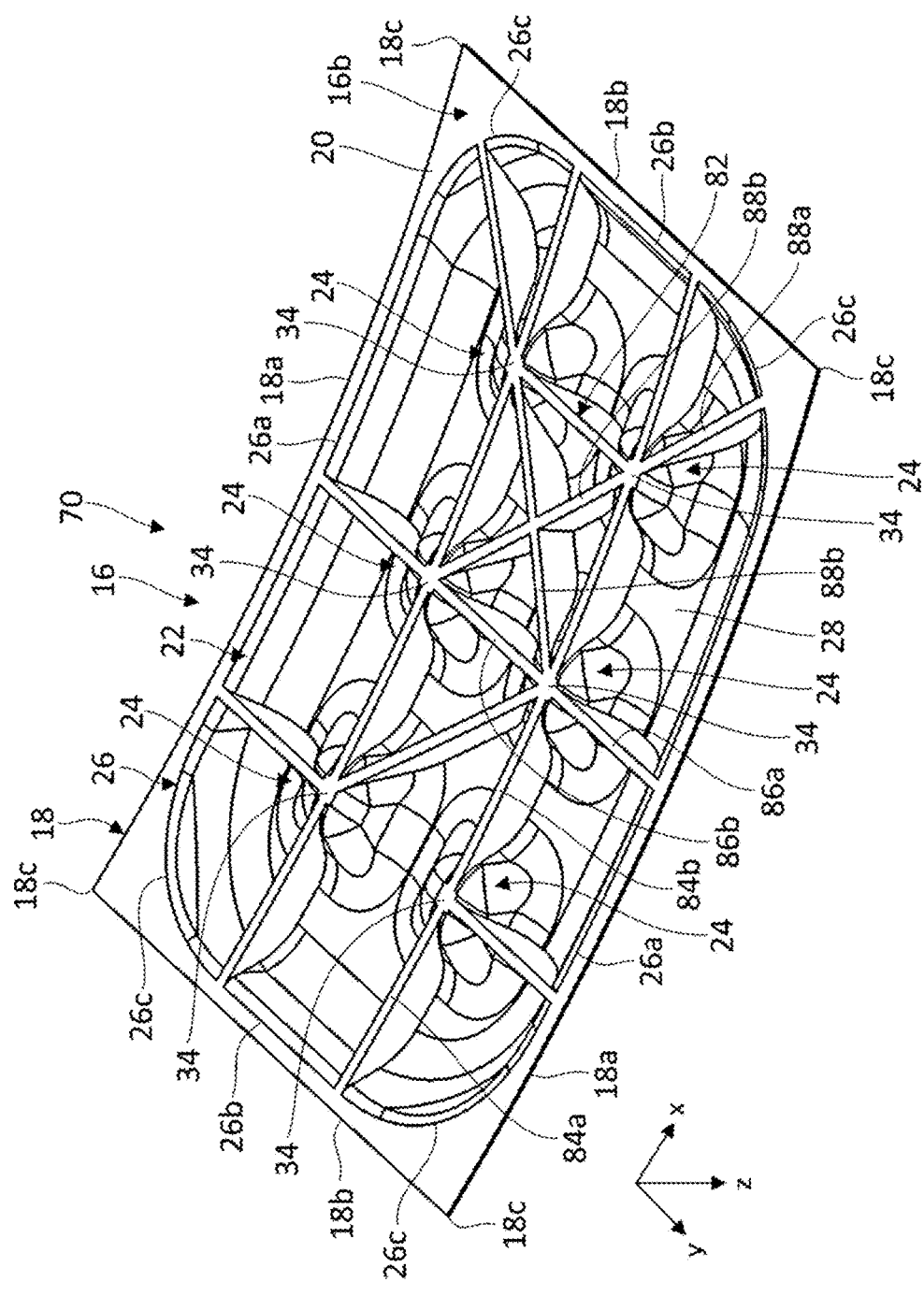
FIG. 13 is a perspective view schematically showing the configuration of the reinforcing member according to the variation.

FIG. 13 is a perspective view schematically showing the configuration of the reinforcing member 70 according to the variation and shows a view of the second surface 16*b* of the reinforcing member 70. The reinforcing member 70 further includes a second rib 82 provided on the second surface 16*b* of the plate-shaped member 16. The lower surface of the second rib 82 is configured to be flush with the bottom portion 34 of each of the outer circumferential portion 20 and the plurality of concave portions 24. The lower surface of the second rib 82 is, for example, configured to be located on an virtual plane B shown in FIG. 5.

The second rib 82 is provided on the second surface 16*b* of the plate-shaped member 16 and extends in the thickness direction from the second surface 16*b*. The second rib 82 is provided inside the convex portion 22. The second rib 82 includes second transverse ribs 84*a*, 84*b* extending in the longitudinal direction (for example, the x direction), second longitudinal ribs 86*a*, 86*b* extending in a direction that intersects the longitudinal direction (for example, the y direction), and second oblique ribs 88*a*, 88*b* extending in oblique directions (for example, the +45-degree directions).

The second transverse ribs 84*a*, 84*b* include a second outer transverse rib 84*a* connecting between the outer circumferential portion 20 and the bottom portion 34 and a second inner transverse rib 84*b* connecting between two bottom portions 34. The second longitudinal ribs 86*a*, 86*b* include a second outer longitudinal rib 86*a* connecting between the outer circumferential portion 20 and the bottom portion 34 and a second inner longitudinal rib 86*b* connecting between two bottom portions 34. The second oblique ribs 88*a*, 88*b* include a second outer oblique rib 88*a* connecting between the outer circumferential portion 20 and the bottom portion 34 and a second inner oblique rib 88*b* connecting between two bottom portions 34. The second rib 82 may include any one or more ribs selected from the group consisting of the second outer transverse rib 84*a*, the second inner transverse rib 84*b*, the second outer longitudinal rib 86*a*, the second inner longitudinal rib 86*b*, the second outer oblique rib 88*a* and the second inner oblique rib 88*b*.

The first rib 72 and the second rib 82 are made of a fiber-reinforced resin. The first rib 72 and the second rib 82 may be made of a thermoplastic fiber-reinforced resin or a thermosetting fiber-reinforced resin similar to that of the plate-shaped member 16 or may be made of a thermoplastic fiber-reinforced resin or a thermosetting fiber-reinforced resin of a material different from that of the plate-shaped member 16. Carbon fiber, glass fiber, or aramid fiber may be used as the reinforcement fiber constituting the first rib 72 and the second rib 82. Engineering plastics such as a thermoplastic resin like PEEK or PEKK or a thermosetting resin such as an epoxy resin may be used as the resin constituting the first rib 72 and the second rib 82. The first rib 72 and the second rib 82 may be made of, for example, a reinforcement fiber that is not continuous with the reinforcement fiber constituting the plate-shaped member 16.

Figure 14:
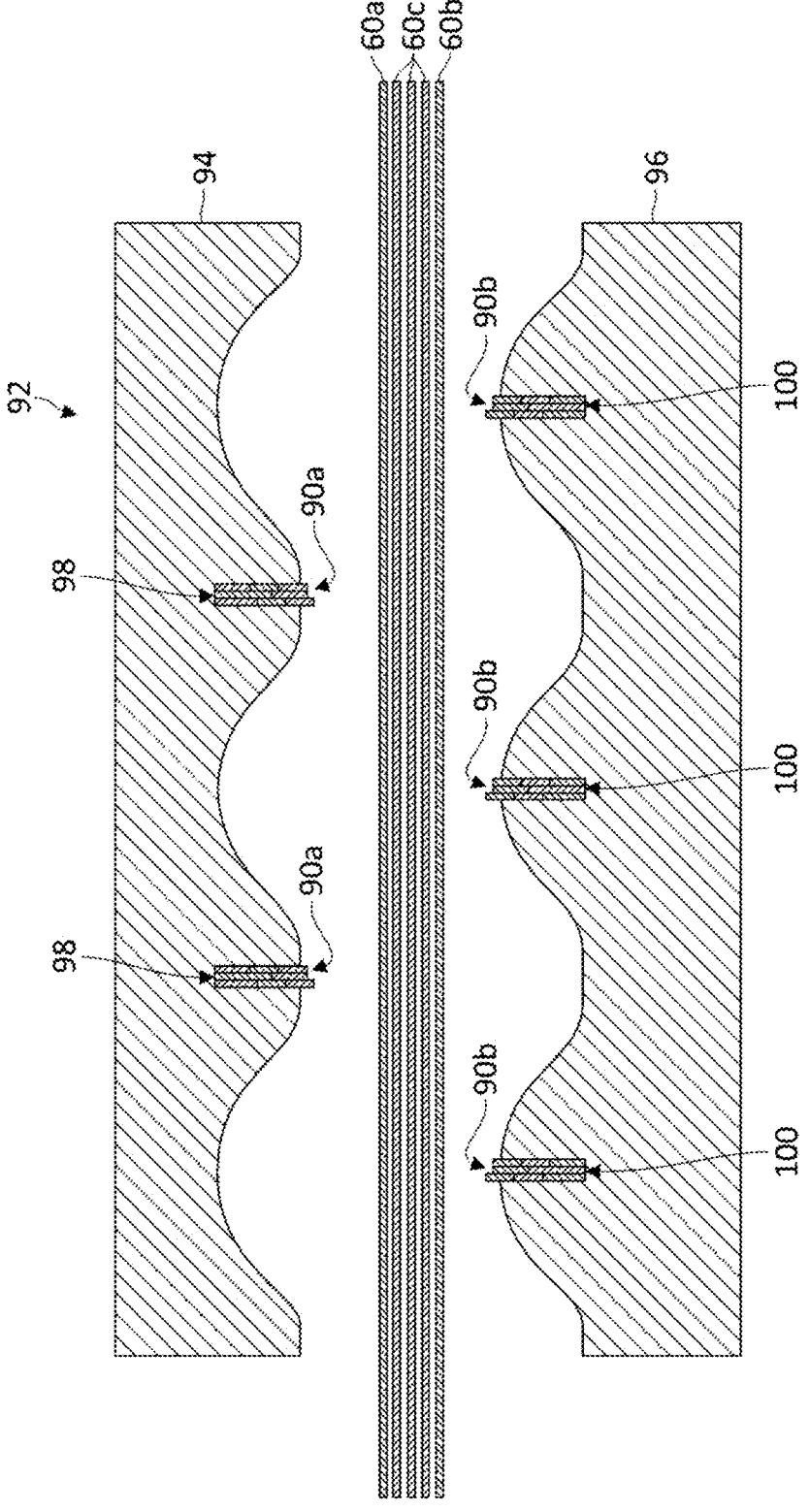
FIG. 14 schematically shows a method of molding the reinforcing member according to the variation.

FIG. 14 schematically shows a method of molding the reinforcing member 70 according to the variation. The mold 92 for forming the reinforcing member 70 of the variation differs from the mold 62 according to the above-described embodiment in that the mold 92 includes groove portions 98, 100 for forming the first rib 72 and the second rib 82. The upper mold 94 has a concave-convex shape corresponding to the first surface 16*a* of the plate-shaped member 16 and has the first groove portion 98 for forming the first rib 72. The lower mold 96 has a concave-convex shape corresponding to the second surface 16*b* of the plate-shaped member 16 and has the second groove portion 100 for forming the second rib 82.

The first groove portion 98 is filled with a prepreg 90*a*, and the second groove portion 100 is filled with a prepreg 90*b*. The prepregs 90*a*, 90*b* filling the groove portions 98, 100 are, for example, chopped material produced by cutting the prepreg tape 50 or the prepreg sheet 60. The size (width and length) of the prepregs 90*a*, 90*b* does not particularly matter. The width of the prepregs 90*a*, 90*b* is 1 mm or more and 20 mm or less and is, for example, 2 mm or more and 10 mm or less. The length of the prepregs 90*a*, 90*b* is 5 mm or more and 50 mm or less and is, for example, 10 mm or more and 30 mm or less.

The plurality of prepreg sheets 60*a*, 60*b*, 60*c* are stacked and arranged between the upper mold 94, in which the first groove portion 98 is filled with the prepreg 90*a*, and the lower mold 96, in which the second groove portion 100 is filled with the prepreg 90*b*. The plurality of prepreg sheets 60*a*, 60*b*, 60*c* are the same as those in the embodiment described above.

By heating and pressurizing the plurality of prepreg sheets 60*a*-60*c* and the prepregs 90*a*, 90*b* between the upper mold 94 and the lower mold 96 shown in FIG. 14, the reinforcing member 70 in which the first rib 72 and the second rib 82 are formed on the plate-shaped member 16 is molded. The plurality of prepreg sheets 60*a*-60*c* and the prepregs 90*a*, 90*b* are heated by the upper mold 94 and the lower mold 96 equipped with a heater to a temperature equal to or higher than the melting point of the thermoplastic resin 54. The plurality of prepreg sheets 60*a*-60*c* and the prepregs 90*a*, 90*b* are integrated by heating and pressurization by the mold 92 and are molded into the reinforcing member 70. Thereafter, the reinforcing member 70 is completed by removing the mold 92.

According to this variation, the first rib 72 is formed on the first surface 16a of the plate-shaped member 16, and the second rib 82 is formed on the second surface 16b of the plate-shaped member 16 so that the rigidity of the reinforcing member 70 is improved further.

The reinforcing member 70 according to this variation may be used by being joined to the main body member 12. For example, in addition to the outer circumferential portion 20 and the bottom portion 34 of the reinforcing member 70, the lower surface of the second rib 82 may be joined to the back surface 12b of the main body member 12. The reinforcing member 70 may be joined to the main body member 12 in the same manner as in the above-described embodiment. The structural member 10 may include the main body member 12 and the reinforcing member 70 according to this variation.

In a further variation, the reinforcing member 70 may include only one of the first rib 72 and the second rib 82. The reinforcing member 70 may include only the first rib 72 and may not include the second rib 82. The reinforcing member 70 may include only the second rib 82 and may not include the first rib 72.

Figure 15:
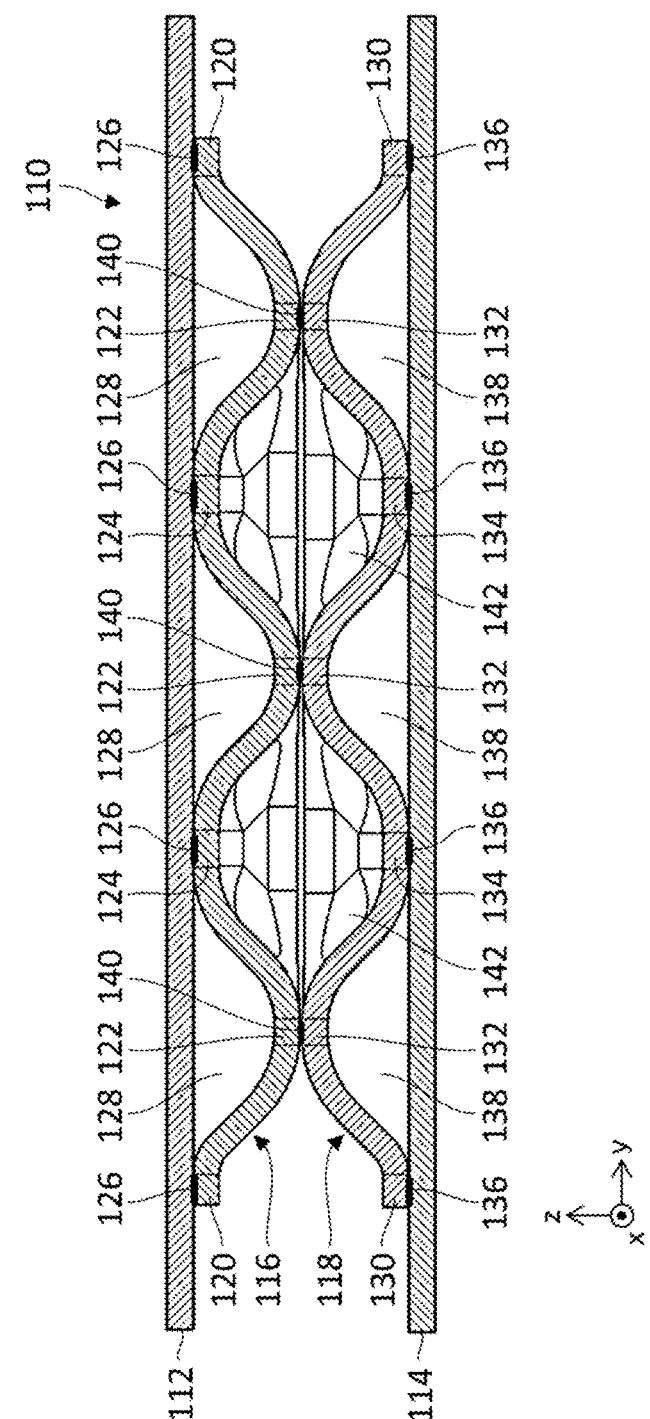
FIG. 15 is a lateral cross-sectional view schematically showing the configuration of a structural member according to another embodiment.

FIG. 15 is a lateral cross-sectional view schematically showing the configuration of a structural member 110 according to another embodiment. The structural member 110 according to this embodiment has a so-called sandwich panel structure. The structural member 110 includes a first main body member 112, a second main body member 114, a first reinforcing member 116, and a second reinforcing member 118.

The first main body member 112 and the second main body member 114 are members corresponding to the skin of a sandwich panel. Each of the first main body member 112 and the second main body member 114 may be configured in the same manner as the main body member 12 according to the above-described embodiment. The first reinforcing member 116 and the second reinforcing member 118 are members corresponding to the core of a sandwich panel. Each of the first reinforcing member 116 and the second reinforcing member 118 may be configured in the same manner as the reinforcing member 14 according to the above-described embodiment or the reinforcing member 70 according to the variation.

The first reinforcing member 116 includes a first outer circumferential portion 120, a first apex portion 122, and a plurality of first bottom portions 124. The first reinforcing member 116 is joined to the first main body member 112 via a plurality of first joints 126. The first main body member 112 is joined to the first outer circumferential portion 120 and the plurality of first bottom portions 124 via the plurality of first joints 126. A first cavity 128 is provided between the first main body member 112 and the first reinforcing member 116.

The second reinforcing member 118 includes a second outer circumferential portion 130, a second apex portion 132, and a plurality of second bottom portions 134. The second reinforcing member 118 is joined to the second main body member 114 via a plurality of second joints 136. The second main body member 114 is joined to the second outer circumferential portion 130 and a plurality of second bottom portions 134 via the plurality of second joints 136. A second cavity 138 is provided between the second main body member 114 and the second reinforcing member 118.

The first reinforcing member 116 is joined to the second reinforcing member 118 via a third joint 140. The third joint 140 is provided between the first apex portion 122 and the second apex portion 132. A third cavity 142 is provided between the first reinforcing member 116 and the second reinforcing member 118.

Each of the first joint 126, the second joint 136, and the third joint 140 may be configured in the same manner as the joint 44 according to the above-described embodiment. Each of the first joint 126, the second joint 136 and the third joint 140 may be formed by fusing a thermoplastic resin by laser heating or ultrasonic heating or may be formed by a desired adhesive. Each of the first joint 126, the second joint 136, and the third joint 140 may be joined by using a fastening member such as a bolt and a rivet.

According to this embodiment, a sandwich panel structure is realized by combining four plate-shaped members. According to this embodiment, the structure of the structural member 110 is simplified and the steps of manufacturing the structural member 110 is simplified as compared to the case where a honeycomb core is used.

Described above is an explanation based on an exemplary embodiment. The embodiment is intended to be illustrative only and it will be understood by those skilled in the art that various design changes are possible and various modifications are possible and that such modifications are also within the scope of the present invention.

Several embodiments of the present invention will be described.

The first embodiment of the present invention relates to a reinforcing member including a plate-shaped member that is made of a fiber-reinforced resin in which a continuous fiber is used as a reinforcement fiber and that has a first surface and a second surface, the plate-shaped member including: an outer circumferential portion that defines an outer edge of the plate-shaped member; a convex portion that is convex on a side of the first surface in an area inside the outer circumferential portion; and a plurality of concave portions that are concave on the side of the first surface in an area inside the convex portion. According to the first embodiment, the concave-convex structure, in which a convex portion is provided inside the outer circumferential portion and a plurality of concave portions are provided inside the convex portion, suitably suppresses deformation such as flexing in the presence of a load in both the longitudinal direction of the reinforcing member and a direction orthogonal to the longitudinal direction. Further, the plate-shaped member may be made of a fiber-reinforced resin in which a continuous fiber is used as a reinforcement fiber, and a lightweight and highly rigid reinforcing member is realized by structuring the plate-shaped member to have concavities and convexities.

The second embodiment of the present invention relates to a reinforcing member according to the first embodiment, wherein the plurality of concave portions are arranged in a lattice shape or a radial shape. According to the second embodiment, the lattice or radial arrangement of the plurality of concave portions suitably suppresses deformation in the presence of a load in the direction in which the plurality of concave portions are arranged.

The third embodiment of the present invention relates to the reinforcing member according to the first or second embodiment, wherein an outer edge of the convex portion has a shape in which four corners of a quadrangle are arc-shaped, and wherein an outer edge of each of the plurality of concave portions has a shape in which four corners of a quadrangle are arc-shaped. According to third embodiment, deformation in the presence of a load in the direction along the side of the quadrangle is suitably suppressed by approximating the outer edge of the convex portion and of each of the plurality of concave portions to a quadrangle. Further, the arc-shape of the four corners of the outer edge of the convex portion and of the plurality of concave portions makes it easy to provide the continuous fiber uniformly along the surface of the convex portion and of the plurality of concave portions and to improve the rigidity of the reinforcing member as a whole.

The fourth embodiment of the present invention relates to the reinforcing member according to the third embodiment, wherein a bottom portion of each of the plurality of concave portions has a shape of a quadrangle or a shape produced by rounding four corners of a quadrangle. According to fourth embodiment, deformation in the presence of a load in the direction along the side of the quadrangle is suitably suppressed by approximating the bottom portion of each of the plurality of concave portions to a quadrangle.

The fifth embodiment of the present invention relates to the reinforcing member according to any one of the first to fourth embodiments, wherein a radius of curvature of the first surface and the second surface of the plate-shaped member in a cross-sectional view orthogonal to the outer edge is configured to be 20 mm or more. According to the fifth embodiment, the radius of curvature of 20 mm or more of the first surface and the second surface makes it easy to provide the continuous fiber uniformly along the first surface and the second surface and to improve the rigidity of the reinforcing member as a whole.

The sixth embodiment of the present invention relates to the reinforcing member according to any one of the first to fifth embodiments, including a continuous fiber sheet formed by weaving a plurality of continuous fibers extending in a first direction and a plurality of continuous fibers extending in a second direction that intersects the first direction. According to the sixth embodiment, deformation such as flexing in the presence of a load in both the longitudinal direction of the reinforcing member and a direction orthogonal to the longitudinal direction is suitably suppressed by using a continuous fiber sheet formed by weaving a plurality of continuous fibers extending in the first direction and the second direction that intersect each other.

The seventh embodiment of the present invention relates to the reinforcing member according to any one of the first to sixth embodiments, further including a rib made of a fiber-reinforced resin and extending from the first surface or the second surface. According to the seventh embodiment, provision of the rib on the first surface or the second surface of the plate-shaped member improves the rigidity of the reinforcing member further.

The eighth embodiment of the present invention relates to the reinforcing member according to the seventh embodiment, wherein the rib includes a first rib that extends from the first surface in an area inside at least one of the plurality of concave portions. According to the eighth embodiment, provision of the first rib inside the concave portion suppresses deformation of the concave portion more suitably and improves the rigidity of the reinforcing member further.

The ninth embodiment of the present invention relates to the reinforcing member according to the seventh or eighth embodiment, wherein the rib further includes a second rib that extends from the second surface in an area inside the convex portion. According to the ninth embodiment, provision of the second rib inside the convex portion suppresses deformation of the convex portion more suitably and improves the rigidity of the reinforcing member further.

The tenth embodiment of the present invention relates to the reinforcing member according to the ninth embodiment, wherein the second rib connects between a bottom portion of at least one of the plurality of concave portions and the outer circumferential portion. According to the tenth embodiment, provision of the second rib that connects between the bottom portion and the outer circumferential portion suppresses deformation of the bottom portion with respect to the outer circumferential portion more suitably and improves the rigidity of the reinforcing member further.

The eleventh embodiment of the present invention relates to the reinforcing member according to the ninth or tenth embodiment, wherein the second rib connects between bottom portions of two of the plurality of concave portions. According to the eleventh embodiment, provision of the second rib that connects between the two bottom portions suppresses deformation of the bottom portion more suitably and improves the rigidity of the reinforcing member further.

The twelfth embodiment of the present invention relates to the reinforcing member according to any one of the first to eleventh embodiments, wherein a resin weight content of the fiber-reinforced resin is 50% or less. According to the twelfth embodiment, the resin weight content of the fiber-reinforced resin of 50% or less improves the rigidity of the reinforcing member further.

The thirteenth embodiment of the present invention relates to a structural member including: the reinforcing member according to any one of the first to twelfth embodiments; and a main body member joined to the outer circumferential portion of the reinforcing member and to a bottom portion of each of the plurality of concave portions, wherein a cavity is provided between the reinforcing member and the main body member. According to the thirteenth embodiment, it is possible to suppress deformation of the main body member by using the reinforcing member and to provide a rigid structural member, by joining the reinforcing member to the main body member. Further, the cavity is provided between the reinforcing member and the main body member so that it is possible to provide a lightweight and highly rigid structural member.

The fourteenth embodiment of the present invention relates to a manufacturing method including: providing a prepreg sheet, produced by impregnating a continuous fiber with a resin, on a mold for molding a plate-shaped member, the plate-shaped member including an outer circumferential portion that defines an outer circumference of the plate-shaped member having a first surface and a second surface, a convex portion that is convex on the side of the first surface in an area inside the outer circumferential portion, and a plurality of concave portions that are concave on the side of the first surface in an area inside the convex portion; and heating and pressurizing the prepreg sheet by using the mold to mold the plate-shaped member made of a fiber-reinforced resin. According to the fourteenth embodiment, the reinforcing member may be manufactured by molding the prepreg sheet by using a mold so that the steps of manufacturing the reinforcing member is simplified. Further, as compared with the case where the where the prepreg cut into small pieces is used, the work of providing the prepreg is simplified and the rigidity of the molded reinforcing member is improved by using the prepreg sheet produced by impregnating the continuous fiber with a resin.

The fifteenth embodiment of the present invention relates to the manufacturing method according to the fourteenth embodiment, wherein the prepreg sheet is formed by weaving a plurality of first prepreg tapes extending in a first direction and a plurality of second prepreg tapes extending in a second direction that intersects the first direction, and wherein each of the plurality of first prepreg tapes and the plurality of second prepreg tapes is formed by impregnating a plurality of continuous fibers extending in one direction with the resin. According to the fifteenth embodiment, the gap between prepreg tapes is variable at the time of molding according to the concave-convex shape of the mold so that it is easy to provide the prepreg tape more uniformly along the concave-convex shape of the mold. As a result, the reinforcing member in which the prepreg tape is provided uniformly is molded, and the rigidity of the reinforcing member is improved.

The sixteenth embodiment of the present invention relates to the manufacturing method according to the fourteenth embodiment, wherein the prepreg sheet is formed by weaving a plurality of first prepreg tapes extending in a first direction and a plurality of second prepreg tapes extending in a second direction that intersects the first direction, and wherein each of the plurality of first prepreg tapes and the plurality of second prepreg tapes is formed by impregnating a plurality of continuous fibers extending in one direction with the resin. According to the sixteenth embodiment, the rigidity of the molded reinforcing member is improved by using the continuous fiber sheet formed by weaving a plurality of continuous fibers extending in the first direction and the second direction that intersect each other.

The seventeenth embodiment of the present invention relates to the manufacturing method according to any one of the fourteenth to sixteenth embodiments, wherein the mold includes a groove for forming a rib extending from the first surface or the second surface, the method further comprising filling the groove in the mold with a prepreg, wherein the prepreg sheet and the prepreg are heated and pressurized by using the mold to mold the reinforcing member in which the rib made of a fiber-reinforced resin is joined to the first surface or the second surface of the plate-shaped member. According to the seventeenth embodiment, the rib may be formed in the reinforcing member so that the rigidity of the molded reinforcing member is improved further. By filling the groove in the mold with the prepreg, the reinforcing member in which the plate-shaped member and the rib are integrated is manufactured easily.

The eighteenth embodiment of the present invention relates to the manufacturing method according to any one of the fourteenth to seventeenth embodiments, further including: joining the outer circumferential portion of the reinforcing member and a bottom portion of each of the plurality of concave portions to a surface of the main body member to form a structural member. According to the eighteenth embodiment, a lightweight and highly rigid structural member is manufactured easily by joining the reinforcing member on the surface of the main body member.

What is claimed is:

1. A reinforcing member comprising a plate-shaped member that is made of a fiber-reinforced resin in which a continuous fiber is used as a reinforcement fiber and that has a first surface and a second surface, the plate-shaped member including:
an outer circumferential portion that defines an outer edge of the plate-shaped member;

a convex portion that is convex on a side of the first surface in an area inside the outer circumferential portion; and a plurality of concave portions that are concave on the side of the first surface in an area inside the convex portion, wherein a radius of curvature of the first surface and the second surface of each of the plurality of concave portions in a cross-sectional view orthogonal to the outer edge is configured to be 20 mm or more.

2. The reinforcing member according to claim 1, wherein the plurality of concave portions are arranged in a lattice shape or a radial shape.

3. The reinforcing member according to claim 1, wherein an outer edge of the convex portion has a shape in which four corners of a quadrangle are arc-shaped, and wherein an outer edge of each of the plurality of concave portions has a shape in which four corners of a quadrangle are arc-shaped.

4. The reinforcing member according to claim 3, wherein a bottom portion of each of the plurality of concave portions has a shape of a quadrangle or a shape produced by rounding four corners of a quadrangle.

5. The reinforcing member according to claim 1, including:

a continuous fiber sheet formed by weaving a plurality of continuous fibers extending in a first direction and a plurality of continuous fibers extending in a second direction that intersects the first direction.

6. The reinforcing member according to claim 1, further comprising:

a rib made of a fiber-reinforced resin in which a discontinuous fiber is used as a reinforcement fiber and extending from the first surface or the second surface.

7. The reinforcing member according to claim 6, wherein the rib includes a first rib that extends from the first surface in an area inside at least one of the plurality of concave portions.

8. The reinforcing member according to claim 6, wherein the rib further includes a second rib that extends from the second surface in an area inside the convex portion.

9. The reinforcing member according to claim 8, wherein the second rib connects between a bottom portion of at least one of the plurality of concave portions and the outer circumferential portion.

10. The reinforcing member according to claim 8, wherein the second rib connects between bottom portions of two of the plurality of concave portions.

11. The reinforcing member according to claim 1, wherein a resin weight content of the fiber-reinforced resin is 50% or less.

12. A structural member comprising:

the reinforcing member according to claim 1; and a main body member joined to the outer circumferential portion of the reinforcing member and to a bottom portion of each of the plurality of concave portions, wherein a cavity is provided between the reinforcing member and the main body member.

* * * * *